United States Patent [19]
Ericson et al.

[11] Patent Number: 5,226,508
[45] Date of Patent: Jul. 13, 1993

[54] DISC BRAKE FOR ELEVATOR DRIVE SHEAVE

[75] Inventors: Richard J. Ericson, Southington; Anthony Cooney, Farmington, both of Conn.

[73] Assignee: Otis Elevator Company, Farmington, Conn.

[21] Appl. No.: 801,304

[22] Filed: Dec. 2, 1991

[51] Int. Cl.⁵ .................................... B66B 5/00
[52] U.S. Cl. ............................ 187/73; 187/20; 187/30; 187/38; 187/74; 188/71.1; 188/71.5
[58] Field of Search .......... 187/20, 30, 31, 38, 187/39, 73, 74, 108, 109; 188/71.1, 71.5, 73.31

[56] References Cited
U.S. PATENT DOCUMENTS

| | | | |
|---|---|---|---|
| 1,924,321 | 8/1933 | James | 187/39 X |
| 3,120,880 | 2/1964 | Joseph | 187/20 X |
| 3,151,705 | 10/1964 | Chatham et al. | 188/71.5 |
| 3,674,119 | 7/1972 | Worstell et al. | 187/38 X |
| 4,585,096 | 4/1986 | Bok | 188/71.5 X |
| 4,977,982 | 12/1990 | Bialy et al. | 187/89 |
| 5,007,505 | 4/1991 | Lindegger | 187/89 |
| 5,010,981 | 4/1991 | Heikkinen | 187/20 |
| 5,067,593 | 11/1991 | Tanaka et al. | 187/73 |

*Primary Examiner*—Robert P. Olszewski
*Assistant Examiner*—Dean A. Reichard
*Attorney, Agent, or Firm*—William W. Jones; Richard D. Getz

[57] ABSTRACT

Movement of an elevator cab drive sheave is controlled by a disc brake assembly which is operably connected to the output shaft and sheave of the elevator drive machine. The disc brake assembly can act as an upward or downward safety brake, and can also serve as the operating brake for normal operation of the elevator. The brake assembly can be retrofitted onto an existing elevator system, and its operation is not affected by any gear degradation in the machine drive gears.

8 Claims, 4 Drawing Sheets

DISC BRAKE FOR ELEVATOR DRIVE SHEAVE

TECHNICAL FIELD

This invention relates to an output shaft mounted brake assembly for an elevator drive sheave, and more particularly to a disc brake assembly which provides both up and down emergency brake utility, as well as normal operating brake utility.

BACKGROUND ART

Elevators are presently provided with a plurality of braking devices which are designed for use in normal operation of the elevator, as for example to hold the cab in place when it stops at a landing; and which are designed for use in emergency situations such as stopping the cab and/or counterweight from plunging into the hoistway pit.

The normal operational brakes on geared elevators are typically drum brakes which engage the machine input shaft to hold the latter against rotation when the cab is stopped at a floor. Elevator safeties are typically devices mounted on the car frame or counterweight assembly which are tripped by sensed overspeed of a governor cable connected to the car or counterweight. Once the safeties are tripped, they will typically grab the guide rails in the hoistway to stop the car or counterweight. The normal operating brakes described above cannot be used in emergency situations, and the elevator safeties described above are not operated in an instance where the cab is moving out of control in the upward direction in the hoistway.

Concerns as to passenger safety in an elevator car moving out of control in the upward direction in a hoistway have prompted safety code revisions in North America which mandate that elevator systems include provisions for safely stopping a runaway cab in the upward direction. These revisions have prompted research and investigation into braking systems which can provide the required function. U.S. Pat. No. 4,977,982 granted Dec. 18, 1990 to L. Bialy, et al., discloses an elevator sheave brake safety which acts directly on the drive sheave to jam the latter in the case of uncontrolled upward movement of the elevator cab, whereby the cab is stopped in the hoistway. The brake safety can also stop movement of the cab away from a landing in the event that the cab doors are open. Both of these features are desirable safety features. The brake safety disclosed in this patent utilizes a pair of wedge blocks which flank the sheave and are spring-biased toward the sheave. When the safety is tripped by undesirable cab movement, the wedges will move against and jam the sheave so that it stops rotating, thereby stopping the cab. The wedging can stop the cab in both the up and down directions. U.S. Pat. No. 5,007,505 granted Apr. 16, 1991 to R. Lindegger discloses an elevator traction sheave brake which includes a vertically reciprocating spring-biased friction plate beneath the sheave. The friction plate is normally held away from the sheave, but during undesirable cab movement, will move upwardly to jam rotational movement of the sheave. As before, this brake can stop upward or downward movement of the cab.

Both of the aforesaid brake assemblies operate directly on the drive sheave or a part attached thereto to jam the sheave at its circumference, and can thus damage the sheave or can create a wedged engagement with the sheave that is very difficult to release. Each of these brakes also results in minimal surface contact between the sheave and the brakes whereby forces exerted on the sheave are quite concentrated, and whereby the cab will be jolted to a stop when the brakes trip.

There are several problems relating to the prior art elevator up direction safeties which remain to be solved. One problem relates to the development of a brake which can be easily retrofitted onto an existing elevator system in the field. Another problem concerns the desirability of providing maximum area contact between the brake and the drive so as to be able to provide high braking torque to the drive. The ability of the brake to be readily released, and to be able to be reused without refurbishing, and to operate with a relatively low power supply are also highly desirable. Another advantage would be to be able to utilize the emergency brake as the normal operating brake which holds the cab in place when stopped at landings. A properly designed output shaft brake mounted to the machine sheave assembly can potentially eliminate the need of an input shaft brake on geared machines, thus providing a desirable duality of function as a safety brake and also a normal machine brake.

DISCLOSURE OF THE INVENTION

This invention relates to a multi-disc disc brake assembly which can be retrofitted onto elevator equipment in the field. The brake assembly is operably mounted on the sheave/output side of the machine drive shaft. The rotating discs in the brake assembly are mounted on a tapered extension which is bolted and pinned to the output shaft for rotation therewith. The stationary portion of the brake assembly carries a torque arm which is operably connected to the machine bedplate. The output shaft extension is also bolted to the drive sheave.

The brake assembly is electromagnetically operated and its actuation is controlled by the conventional governor rope cab speed detector assembly, and by the cab door sensors and cab movement sensors. The brake assembly thus can be tripped in a cab overspeed (up or down) situation, and also when the cab moves away from a landing with its doors open. The geometry of the brake assembly allows the use of large brake discs, i.e., fifteen to twenty inch diameter discs, for example, which provide a large magnetic path so that high braking torque can be developed at low operating power. The large magnetic path reduces or eliminates magnetic saturation in the non-rotating metal brake discs which in turn allows a relatively large brake-actuating spring force to be used in the brake. By way of example, the brake of this invention can develop 3,800 to 6,000 ft. lbs. of torque using less than one amp of current. By coupling the brake assembly with the drive sheave and output shaft, the torquing forces are spread out between the two elements, and the condition of the gears (worm gear and ring gear) or helical gear in a geared machine has no effect on the operability of the brake. Thus, were the gears to break causing machine failure and a runaway sheave, the brake would still set and be able to stop the sheave.

It is therefore an object of this invention to provide a safety brake assembly for an elevator system which is capable of stopping an elevator cab moving in an unsafe manner upwardly in the hoistway. Proper sizing of this brake could allow it to be used for downward, low speed protection also.

It is a further object of this invention to provide a brake assembly of the character described which acts on the output side of the machine output shaft.

It is another object of this invention to provide a brake assembly of the character described which can be retrofitted onto existing equipment in the field.

It is an additional object of this invention to provide a brake assembly of the character described which includes an electromagnetic brake that can develop high braking torque with very low electrical power input.

It is a further object of this invention to have a device which can automatically reset in the event of a power failure thus alleviating the need for call-backs or battery backup power supplies.

These and other objects and advantages of this invention will become more readily apparent from the following detailed description of a preferred embodiment thereof when taken in conjunction with the accompanying drawings, in which:

BEST MODE FOR CARRYING OUT THE INVENTION

Figure 1:
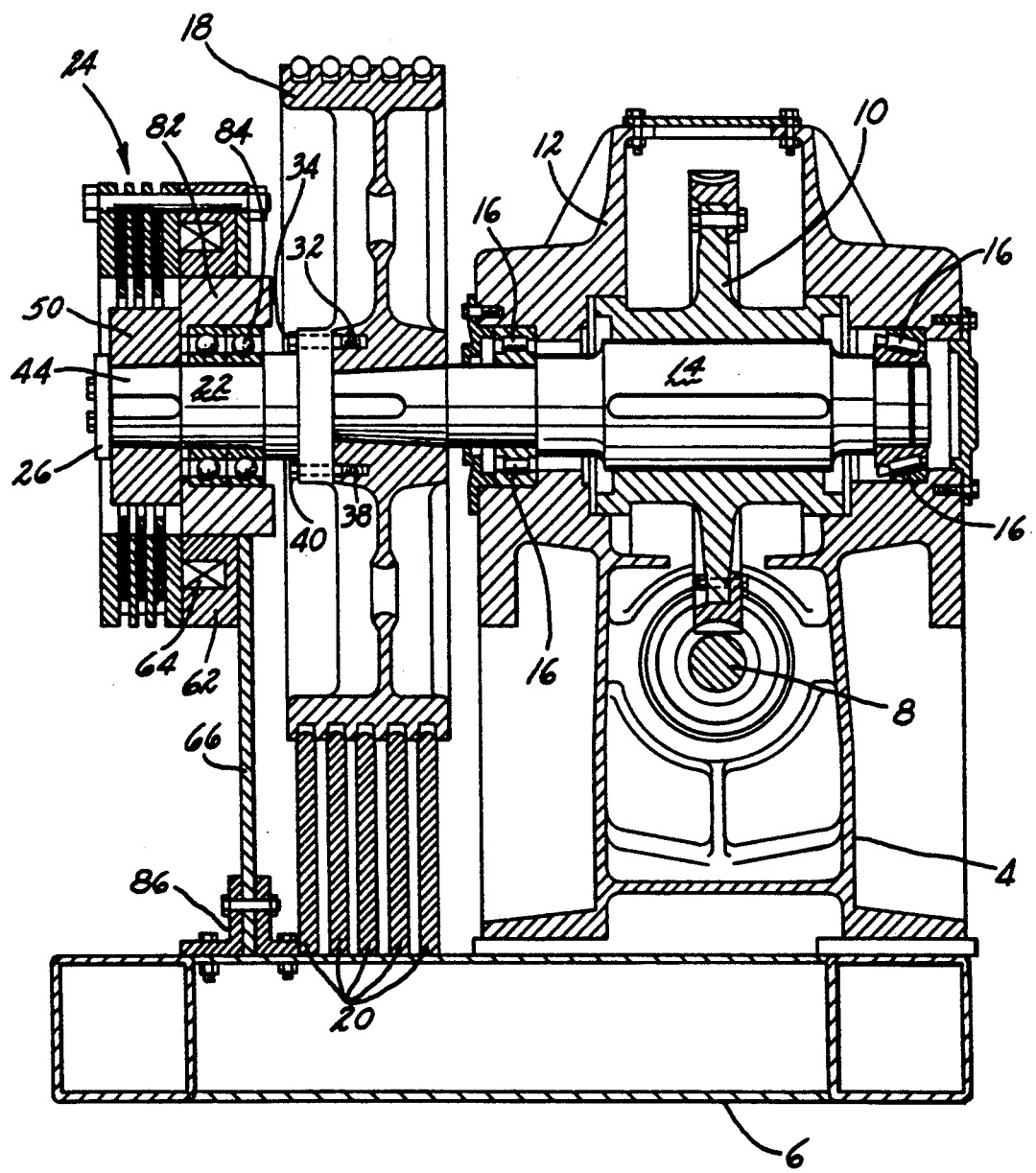
FIG. 1 is a cross-sectional view of a geared elevator machine having a preferred embodiment of a safety brake thereon which is formed in accordance with this invention.

Referring now to FIG. 1, there is shown a preferred embodiment of a retrofitted multiple disc emergency brake mounted on a conventional geared elevator drive machine. The machine is denoted generally by the numeral 2 and, includes a lower casing 4 which is mounted on a bedplate 6 in the machine room of the building housing the elevator. The lower casing 4 houses a worm gear 8 which meshes with a ring gear 10 mounted in an upper casing 12 of the machine 2. It will be understood that the worm gear 8 is driven by an electric motor (not shown) and in turn drives the ring gear 10. The ring gear 10 is keyed to an output shaft 14 which is journaled in bearings 16 in the upper casing 12. The elevator drive sheave 18 is mounted on and keyed to the output shaft 14 and carries the elevator cab and counterweight cables 20. The components described to this point constitute the conventional general components of a geared elevator drive assembly. It is such an assembly that is modified as follows to provide an up-down emergency braking safety feature.

An output shaft extension 22 is mounted on the output shaft 14 and the sheave 18 to form a rotating extension thereof. A multiple disc brake assembly denoted generally by the numeral 24 is mounted on the output shaft extension 22. The conventional cover plate 26 is mounted on the end of the output shaft extension 22 to hold the brake assembly 24 in place on the extension 22.

Figure 2:
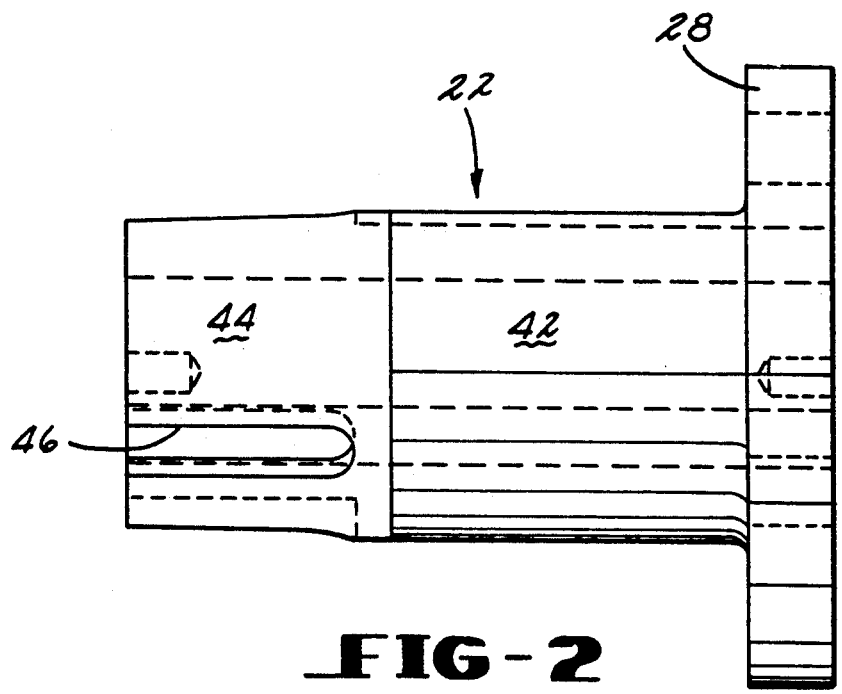
FIG. 2 is a side view of the output shaft extension portion of the brake assembly.
Figure 3:
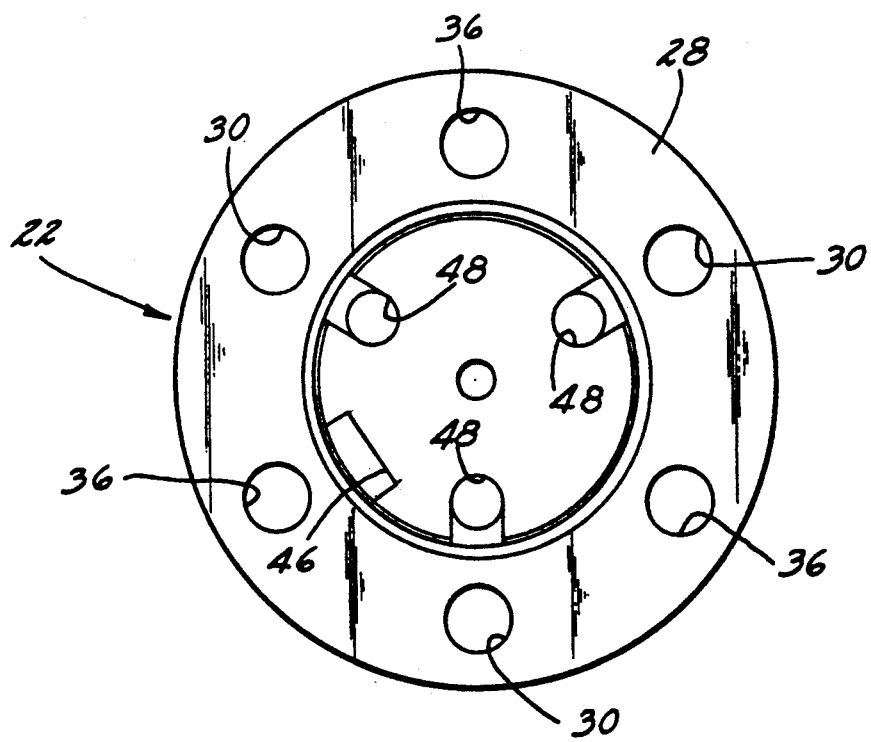
FIG. 3 is an end elevational view of the shaft extension as seen from the left hand side of FIG. 2.

Referring to FIGS. 2 and 3, details of the output shaft extension 22 are shown. The extension 22 has an end flange 28 which faces the end of the output shaft 14 and the side of the sheave 18. The flange 28 has three holes 30 which align with existing threaded holes 32 in the sheave 18 (see FIG. 1). The existing holes 32 are normally used to mount an hydraulic pulling jack on the sheave 18 when it is necessary to remove the sheave 18 from the output shaft 14 for servicing. Bolts 34 (see FIG. 1) are passed through the holes 30 and screwed into the tapered sheave holes 32 to form a first securement of the extension 22 to the sheave 18. The flange 28 also has a second set of equispaced holes 36 which face the sheave 18 after the extension 22 is bolted thereto. The second set of flange holes 36 are then used as pilots for drilling matching holes 38 in the sheave 18 (see FIG. 1). Securement pins 40 are then pressed into the aligned holes 36, 38 to form a secondary connection between the extension 22 and the sheave 18. There are thus six torque transmitting connections between the extension flange 28 and the sheave 18.

Projecting from the flange 28 is a cylindrical boss 42 which terminates in a tapered nose 44. A key slot 46 is formed in the nose 44 for keying a part of the brake assembly to the extension 22, as will be explained in greater detail hereinafter. There are three equispaced through passages 48 drilled through the boss 42 and nose 44. These passages 48 are aligned with standard tapped holes in the end of the output shaft 14 which normally receive bolts used to secure the cover plate 26 to the end of the output shaft 14 in a standard machine that has not been fitted with the emergency safety brake of this invention. Appropriately sized bolts or threaded studs are passed through the cover plate 26 and the passages 48 and are screwed into the preexisting tapped holes in the output shaft 14. In this manner a direct connection between the extension 22 and the output shaft 14 is made. These fasteners provide a reaction onto the face of the drive sheave, which forces the sheave backward on its taper and thus holds it tightly in place. It will be noted that there are in all nine connections between the extension 22 and the sheave/output shaft combination. This ensures safe transmittal of torque between the respective parts of the drive and brake assembly.

Figure 5:
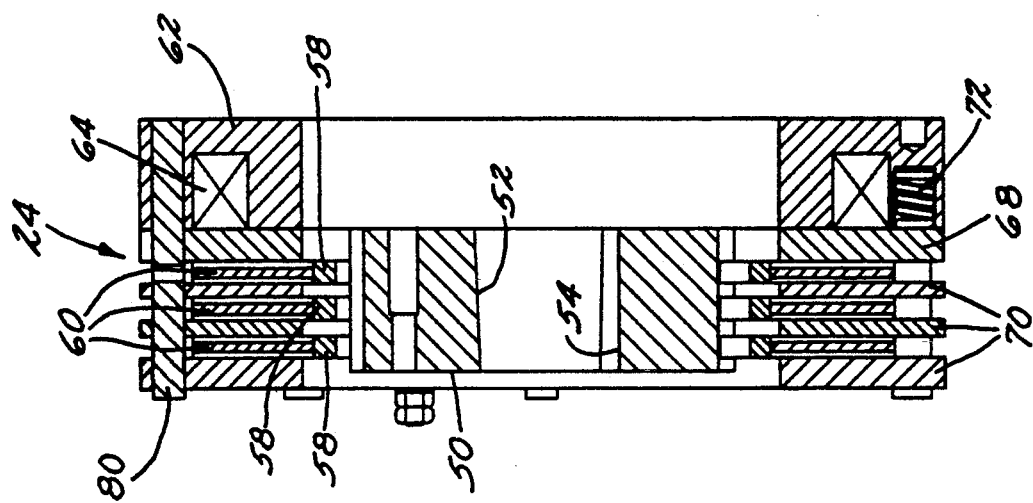
FIG. 5 is a sectional view of the disc assembly taken along line 5—5 of FIG. 4.
Figure 4:
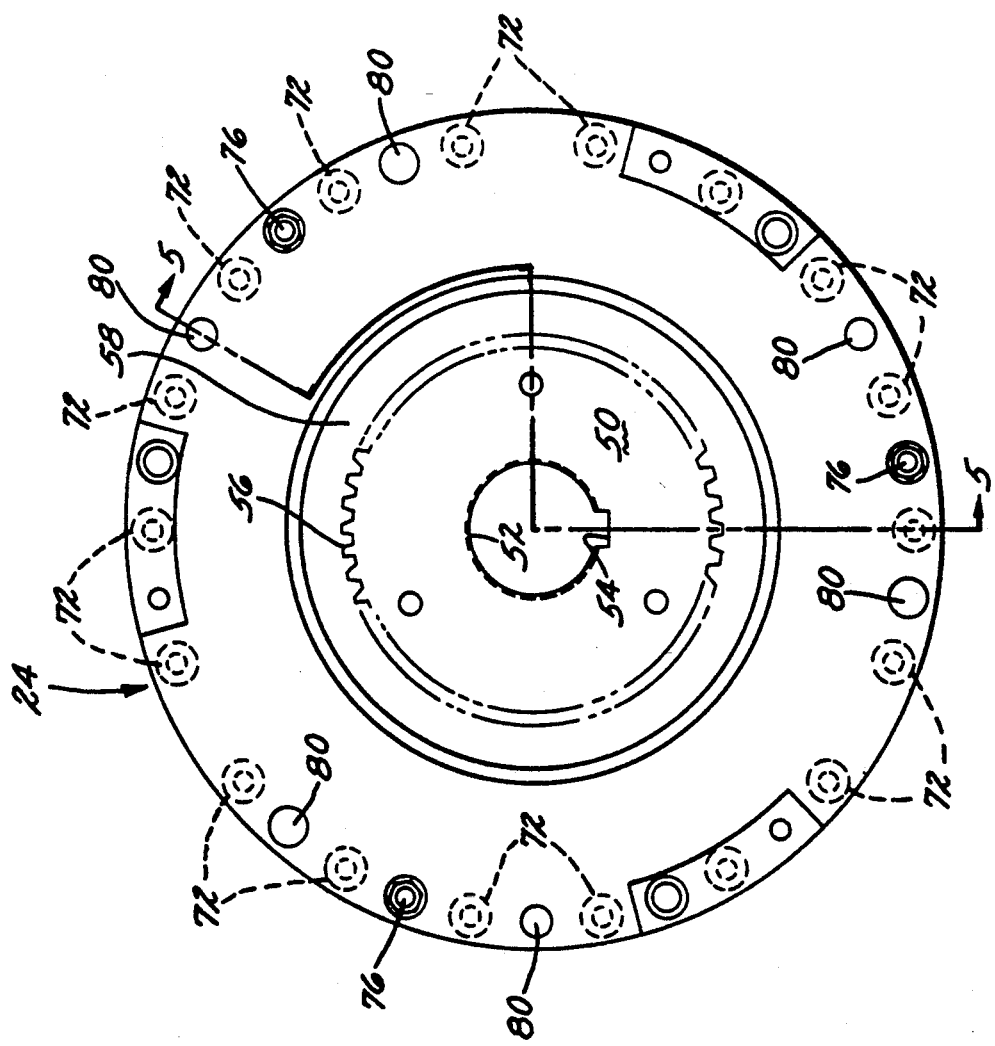
FIG. 4 is an end view of the multiple disc brake assembly as seen from the left hand side of FIG. 1.

Referring now to FIGS. 1, 4 and 5, details of the brake assembly 24 are shown. As most clearly shown in FIGS. 4 and 5, the brake assembly 24 includes a central hub 50 which has a through tapered passage 52 with a key slot 54. The hub 50 is fitted onto the extension nose 44 and keyed thereto for rotation therewith. It will be noted from FIG. that the plate 26 jams the hub 50 on the extension nose 44. Referring back to FIG. 4, the outer circumferential surface of the hub 50 is formed with splines 56 so as to be fitted with a plurality of internally splined friction discs 58 of a suitable number, depending on the amount of braking torque which is required in each application. Each of the discs 58 carries an annular radially outwardly extending friction pad 60. It will be appreciated from the above, that the hub 50, discs 58 and pads 60 all rotate with the output shaft 14 and sheave 18.

The brake assembly 24 also includes a magnet assembly 62 having a coil 64, and which is mounted on a torque arm 66 (See FIG. 1). An armature plate 68 is disposed adjacent to the magnet assembly 62, followed by a series of annular brake plates 70. It will be noted that the friction discs 60 and brake plates 70 are interleaved. The armature plate 68 is biased away from the magnet assembly 62 by a plurality of coil springs 72, and the brake plates 70 are biased apart by a plurality of light coil springs 74 mounted on bolts 76 which extend through the armature plate 68 and the brake plates 70. The brake plates 70 are thus held away from the interleaving friction discs 60 by the coil springs 74 when the brake assembly is "off". Nuts 78 are threaded onto the ends of the bolts 76 to allow for adjustment of the spacing between the plates 70 to account for wear on the brake during its useful life. A plurality of guide dowels 80 dispersed circumferentially about the brake assembly 24 extend through the magnet assembly 62, and the armature plate 68 and brake plates 70 to guide axial movement of these components relative to each other when the brake is set and released.

Figure 8:
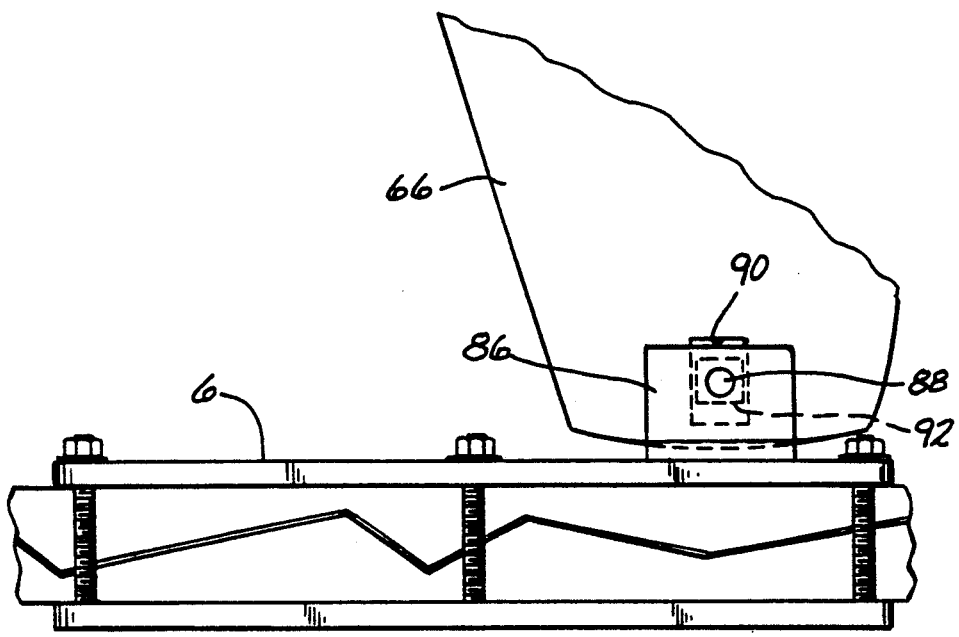
FIG. 8 is a fragmented side elevational view of the torque arm-machine bedplate interconnection portions of the brake assembly.
Figure 6:
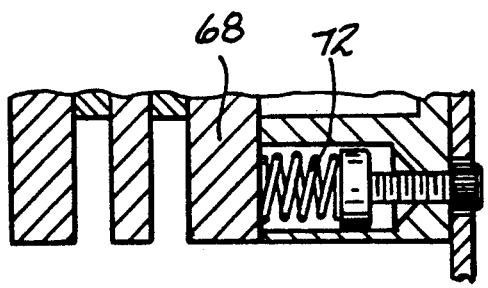
FIG. 6 is a fragmented sectional view of one of the brake actuating springs in the brake assembly.
Figure 7:
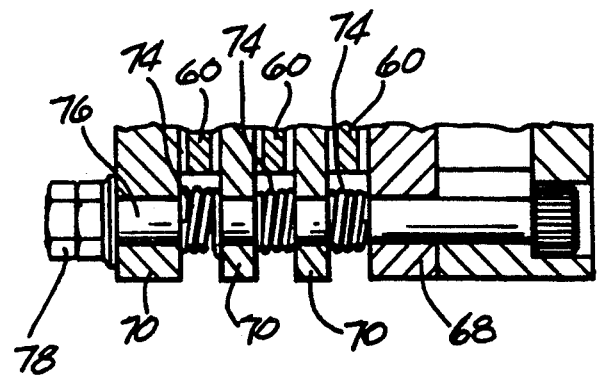
FIG. 7 is a fragmented sectional view of one of the brake plate adjustment bolts in the brake assembly.

Referring back to FIG. 1, it will be noted that the magnet assembly 62 is mounted on a sleeve 82 which in turn is mounted on the outer race of a ball bearing 84 assembly. The sleeve 82 passes through and is fixed to the torque arm 66. It will be appreciated from the above that the discs 60 rotate with the output shaft 14 and sheave 18, while the plates 70 remain relatively stationary. The torque arm 66 is connected to the bedplate 6 by means of a clevis 86 bolted to the bedplate 6, and a transverse pin 88 which passes through the torque arm 66 and clevis 86. FIG. 8 shows details of the connection between the torque arm 66 and bedplate 6. The torque arm 66 has a rectangular opening 90 cut therein through which the pin 88 passes. A hardened steel plaque 92 is mounted on the pin 88 and positioned within the torque arm opening 90. The plaque 92 is smaller than the opening 90 so that the torque arm 66 can undergo limited movement at its lower end within the clevis 86. This limited movement will allow for a normal degree of wobble of the output shaft extension 22 without interfering with normal operation of the drive.

The emergency brake assembly described above operates as follows. During normal safe operation of the elevator the coil 64 is energized, and the armature plate 68 is magnetically held against the magnet assembly 62 causing the actuating springs 72 to be compressed. The brake assembly 24 is thus in a "release" mode, and the friction discs 60 will be free to rotate with the extension 22, uninhibited by the plates 70. In the event of an unsafe operating episode, such as overspeed in either direction, or door-open movement of the cab away from a landing, power to the coil 64 will be switched off, and the coil 64 will deenergize. The actuating springs 72 will then move the armature plate 68 away from the magnet assembly 62 and toward the annular brake plates 70. The force of the springs 72 is such that the spacer springs 74 will be compressed and the plates 70 will clamp the discs 60 against further movement. This will move the torque arm 66 into locked engagement with the clevis 86 and bedplate 6. Movement of the output shaft 14 and sheave 18 will thus be interrupted and the cab will stop its movement in the hoistway. At the same time, power to the machine may be interrupted. After the cause of the unsafe cab movement has been discovered, the brake assembly 24 can be released merely by restoring power to the coil 64.

It will be readily appreciated that the brake assembly of this invention can be retrofitted onto an existing elevator in the field, and can be easily connected to the elevator controller and the governor cable system (governor overspeed switch) so as to be selectively actuated when the controller senses door-open cab movement away from a landing, or when the governor cable experiences excessively high speed movement in either direction.

A control circuit which is shown in FIG. 5 of U.S. Pat. No. 5,002,158 granted Mar. 26, 1991 to R. Ericson, et al., can be used with the brake system of this invention if modified as follows. In the patent a solenoid 122 is shown to be actuated, but in the system of this invention, the armature coil will be substituted for the solenoid. A power relay solenoid is interposed between the governor overspeed switch and the coil, and is powered by a low voltage control circuit. The brake coil is powered by a high voltage 110 V DC power supply through the interposed power relay solenoid. The power relay solenoid can also receive normal brake operation signals when the disc brake is used as the regular machine brake.

The brake assembly of this invention can generate high torque braking forces without damaging components of the elevator drive, and can be operated with a very small current power supply. The loose fitting between the torque arm and bedplate allows for normal wobble of the brake assembly on the sheave, and relaxes installation parameters. While the brake assembly has been described herein as an emergency safety brake, it will be readily appreciated that it could also be used as the normal cab holding brake when the cab is stopped at landings to allow normal passenger traffic between the cab and landings. Likewise, it will be readily apparent that the brake assembly's utility is not limited to geared elevator machines, but can also be used in conjunction with a gearless elevator system.

Since many changes and variations of the preferred embodiment of this invention may be made without departing from the inventive concept, it is not intended to limit the invention otherwise than as required by the appended claims.

What is claimed is:

1. In combination with an elevator drive system which includes a drive machine having a rotatable output shaft and a sheave fixed to said output shaft for concurrent rotation with the latter, a plurality of hoist cables reeved over the sheave, and wherein the drive machine is fixed to a bedplate, a brake assembly comprising:
   a) a generally cylindrical extension removably secured to at least one of said output shaft and said sheave, said extension being generally coaxial with said output shaft and disposed on a side of said sheave opposite said output shaft;
   b) friction disc means mounted on said extension and rotatable therewith along with said output shaft and sheave;
   c) brake plate means journaled on said extension and fixed against rotation thereon, said friction disc means being interposed between components of said brake plate means; and
   d) actuating means for causing said brake plate means to clamp said friction disc means against rotation on demand, thereby stopping rotation of said output shaft and sheave.

2. The combination of claim 1 wherein said brake plate means is operably connected to said bedplate by a torque arm.

3. The combination of claim 2 wherein said torque arm is loosely connected to said bedplate to accommodate limited rotational wobble of said extension and resultant vibration of said brake plate means without interfering with rotation of said output shaft and sheave.

4. The combination of claim 1 wherein said friction disc means and said brake plate means comprise a plurality of friction discs associated with sandwiching pairs of brake plates.

5. The combination of claim 4 wherein said actuating means comprises an electromagnetic actuator for holding said brake plate means components in a spread condition, and spring means biasing said brake plate means components toward disc clamping positions.

6. The combination of claim 1 wherein said extension is connected to said output shaft and to said sheave.

7. The combination of claim 1 wherein said brake plate means are journaled on said extension by roller bearings.

8. An elevator drive system having a drive machine with a rotating output shaft and a sheave fixed to said output shaft for concurrent rotation with the latter, and a plurality of hoisting cables reeved over said sheave, said machine being fixed to a bedplate, and said drive system further comprising:

a) friction disc means mounted on said output shaft for rotation with said output shaft along with said sheave;

b) brake plate means journaled on said output shaft and fixed against rotation thereon, said friction disc means being interposed between components of said brake plate means; and c) actuating means for causing said brake plate means to clamp said friction disc means against rotation on demand, thereby stopping rotation of said output shaft and sheave so as to stop further movement of the hoisting cables so long as said friction disc means remains clamped.

* * * * *